US006791019B2

(12) United States Patent
Hayakawa

(10) Patent No.: US 6,791,019 B2
(45) Date of Patent: Sep. 14, 2004

(54) STAFF SHEET PRINTER

(76) Inventor: Toshio Hayakawa, 10021 Tabor St. #311, Los Angeles, CA (US) 90034

( * ) Notice: Subject to any disclaimer, the term of this patent is extended or adjusted under 35 U.S.C. 154(b) by 207 days.

(21) Appl. No.: 10/059,134

(22) Filed: Jan. 29, 2002

(65) Prior Publication Data

US 2002/0178897 A1 Dec. 5, 2002

Related U.S. Application Data

(63) Continuation of application No. 09/866,220, filed on May 25, 2001.

(51) Int. Cl.[7] .............................................. G09B 15/02
(52) U.S. Cl. .................................................... 84/483.1
(58) Field of Search ...................... 84/462, 465, 470 R, 84/471 R, 477 R, 483.1, 483.2, 484

(56) References Cited

U.S. PATENT DOCUMENTS 4,392,409 A * 7/1983 Coad et al. ................... 84/462
4,958,551 A * 9/1990 Lui ............................. 84/462
6,137,041 A * 10/2000 Nakano .................... 84/470 R

* cited by examiner

*Primary Examiner*—Jeffrey W. Donels

(57) ABSTRACT

The purposes of this staff sheet printer (100) is to translate played acoustic sound into music notes as music staff sheets (60) by having a plurality of sensors attached on an acoustical musical instrument. Conventionally, a music teacher listens while a musical instrument player plays. Checking the skill of novice players requires well-trained music teachers. The newly invented staff sheet printer (100) can ascertain musical instrument players' skills easily since it can print out played notes as exactly as the players play acoustic musical instruments. The musical instrument players can visually check for themselves whether correct keys have been played or not, by comparing the output staff sheets (60) and the original music sheets.

3 Claims, 6 Drawing Sheets

STAFF SHEET PRINTER

BACKGROUND—CROSS REFERENCE TO RELATED APPLICATIONS

This application is a continuation of patent application Ser. No. 09/866,220 filed May 25, 2001.

BACKGROUND—FIELD OF INVENTION

This invention relates to a music printer that prints music staff sheets.

BACKGROUND—DESCRIPTION OF PRIOR ART

A musical instrument player often starts taking music lessons at a young age. While musical lessons for children can often be fun and lead to exciting events for children and their parents, these lessons also require great diligence and patience, along with continued support from both parents and teachers. That is why, over the years, many instructional devices have been invented to facilitate the process of learning a musical instrument. However, no advanced devices have been invented for some traditional instruments such as the Japanese Koto or xylophone. Passing on traditional skills from one generation to the next is not an easy task because knowledgeable teachers and helpful teaching aid devices are both lacking. Now, by using this newly invented staff sheet printer, music teachers will be enabled to instruct their students how to play these traditional musical instruments easily.

OBJECTIVES AND ADVANTAGES

Accordingly, in addition to the objects and advantages of the staff sheet printer described in this patent application, several other objects and advantages of the present invention are:

(a) to provide a staff sheet printer that can print the staff sheets of music played by a musical instrument student as he/she practices; these staff sheets can then be compared with the original music staff sheets to see if any errors have been made;

(b) to provide a staff sheet printer that can improve the artistic skill of musical instrument players who can check the notes they played printed precisely on staff sheets;

(c) to provide a staff sheet printer that can save music lessons fees and time by reducing number of lessons; and (d) to provide a staff sheet printer that enables musical instrument players to duplicate a hardcopy of their own music notes easily.

SUMMARY

A conventional way to practice musical instruments is simply to play and record the music being played with conventional recording devices such as tape players, and then to play back the recorded music. In this way, a musical instrument player can attempt to find out where mistakes have occured while listening to the tape player. Alternatively, a music teacher can listen while a musical instrument player plays. With these conventional methods, finding and correcting any errors made depends on the capability of human ears. However, human ears have a limited capability of listening with a high degree of accuracy. For this reason, neither the musical instrument players who listen to the recorded sound nor the music teachers who listen while the musical instrument player plays, can catch all errors. This kind of task requires a highly trained and skilled music teacher, especially when a novice is playing. With more experienced players, errors are often more difficult to find.

By contrast, the newly invented staff sheet printer, which prints notes exactly as they are played, makes it possible for musical instrument players at any level to discover their mistakes by comparing printed staff sheets with the original music staff sheets. Once all music notes are played and stored on this staff sheet printer, by simply pressing a print button, the printer prints out the played notes on paper as staff sheets. Musical instrument players can then visually compare the difference between the original music staff sheets and the printed staff sheets. Through accurately seeing their mistakes, rather than using a listening method limited by human capability, musical instrument players can more speedily improve their performance skills.

BRIEF DESCRIPTION OF THE DRAWING FIGURES

DETAILED DESCRIPTION OF THE PREFERRED EMBODIMENT—FIGS. 1, 2, 3, 4, 5, 6, AND 7

Figure 1:
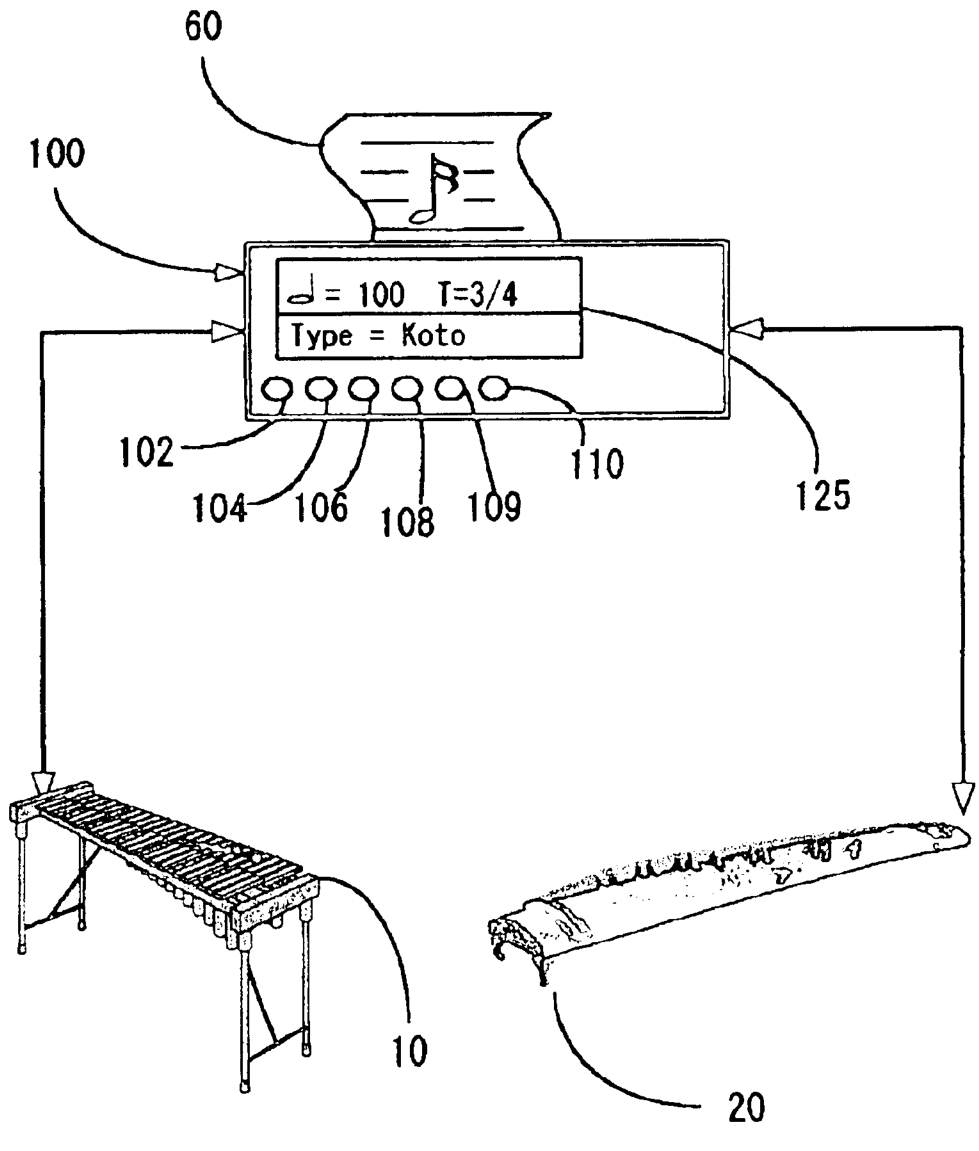
FIG. 1 shows how a newly invented staff sheet printer connects to musical instruments. An acoustic Japanese Koto and an acoustic xylophone are used as an example application.

FIG. 1 illustrates a typical connection diagram of a newly invented staff sheet printer 100. The staff sheet printer 100 is connected to the acoustic xylophone 10 and Japanese Koto 20 as a typical example application. In reality, the staff sheet printer 100 can connect to any musical instruments by changing a physical shape and characteristic of the sensors 130.1 and 130.2 (FIG. 2).

Figure 2:
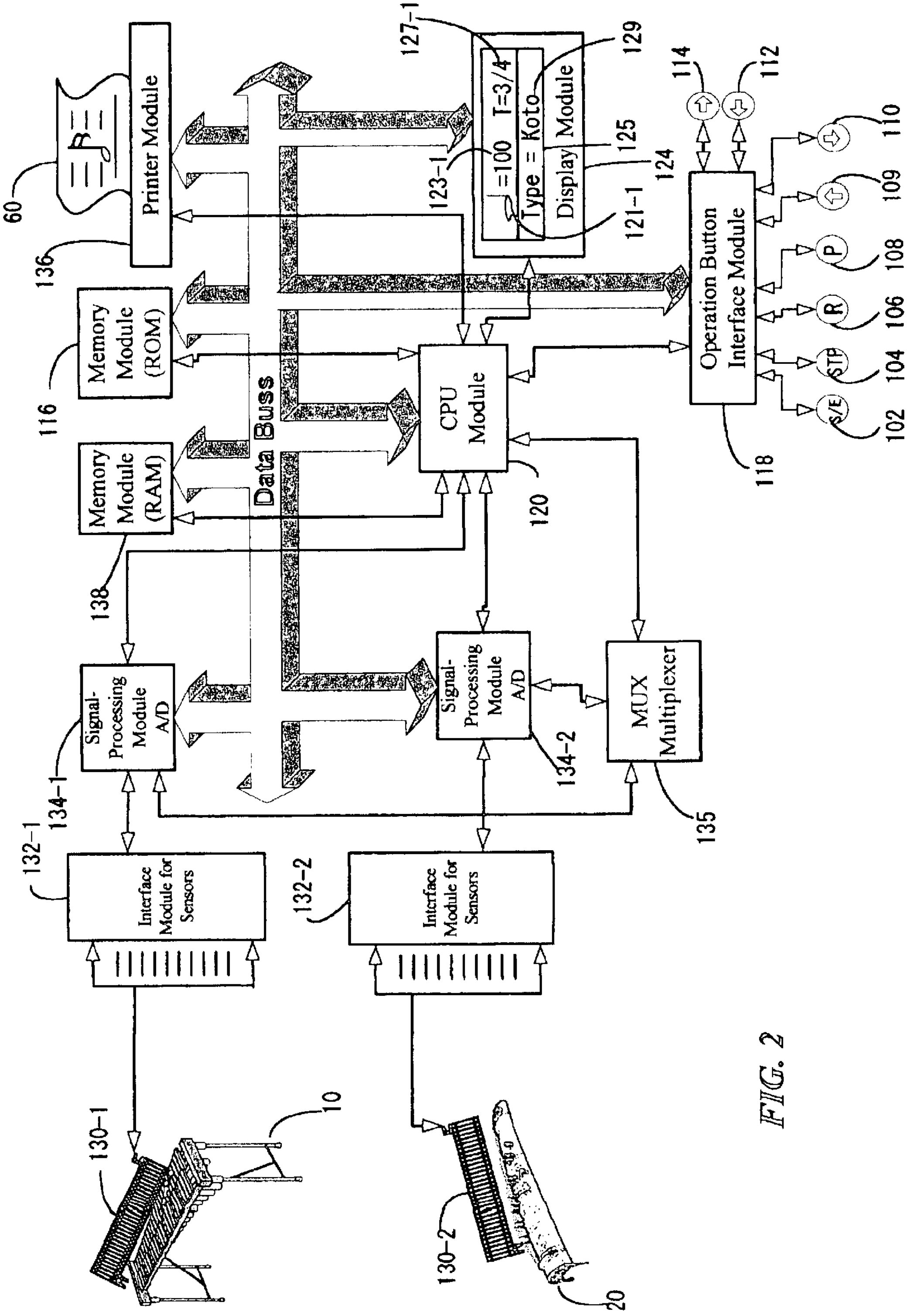
FIG. 2 shows a functional block diagram of the newly invented staff sheet printer for musical instruments, using the acoustic musical instruments.

Referring to FIG. 2, the staff sheet printer 100 (FIG. 1) consists of following: sensors 130.1 and 130.2, interface modules for the sensors 132.1 and 132.2, signal processing modules 134.1 and 134.2, a multiplexer 135 for the signal processing modules 134.1 and 134.2, memory modules RAM 138, memory modules ROM 116, a CPU module 120, a printer module 136, display module 124, and an operation button interface module 118.

Referring to FIG. 2, the printer module 136 located inside a staff sheet printer 100 (FIG. 1), prints played music notes onto a paper 60 out of the staff sheet printer 100 as the music staff sheets 60. A roll of unprinted paper 60 is stored in the staff sheet printer 100 so that the staff sheet printer 100 can print the played music in continues fashion as the staff sheet paper 60. The printer module 136 has control functions such as out of paper or out of toner ink, monitoring print engine head, checking paper jam, and other warning messaging systems. For example, when the roll paper out in the staff sheet printer 100, then the warning message is sent to the display module 124 via the CPU module 120. Hence, a user is alerted to put paper in place before printing. The printer module 136 also controls arrays of pins vertically mounted on a print head, which translates and prints staff sheets based on the printable bit map data in the memory module RAM 138. The print head is the standard print head used in any dot-matrices printers for personal computers. Images are created as each arrays of pins strikes ink ribbons, leaving dots on the paper 60 according to the printable bit map data created and stored by the CPU module 120. When higher resolution printing is desired, a laser engine head or a thermal print head can be used to print images using standard laser beam printing technology.

Referring to FIG. 2, the signal processing module 134 receives signals that are generated by the sensors 130.1 and 132.2. Once the signal processing modules 134.1 and 134.2 receive the signals through the interface module 132.1 and 132.2 for the musical instrument 10 and 20 respectively, the signal processing module 134.1 and 134.2 arrange the signals for pre-printing format. Then, the signal processing modules 134.1 and 134.2 send data to the memory module 138 RAM (random access memory) for later processing. The signal processing modules 134.1 and 134.2 are analog-to-digital converters. Since all signals sent by the sensors 130.1 and 130.2 are analog signals, they need to be converted into digital signals using analog-to-digital converters. There are many commercially produced IC chips readily available to implement this function.

Referring to FIG. 2, a staff sheet printer 100 has function buttons to control the functions of this newly invented staff sheet printer 100. These buttons are a S/E start/enter button 102, a STP stop button 104, a R record 106, a P print button 108, a up or down button 109 and 110 respectively, and a cursor left or right position button 112 and 114 respectively. All of these buttons are interfaced with the operation button interface modules 118.

Referring to FIG. 2, the display module 124 is mounted on a staff sheet printer 100. The purpose of the display module 124 is to display responses resulting from operation of the staff sheet printer 100 when a player pushes buttons located on the staff sheet printer 100. The display module 124 can display alphanumeric characters and music notes using standard liquid crystal display (LCD) unit 125. The LCD unit 125 has two-rows by twenty-four columns. A CPU module 120 sends display characters for displaying operational and other messages whenever active modules such as the printer module 136 generate messages. A display module 136 is used to display and gather the basic information to the music to be played, such as a given note 121.1 with a tempo 123.1 and its time signature 127.1 of that music depicted in FIG. 6, before a user starts to play. To implement this commercially available LCD unit 125 is a rather common task since it is used in most electronic equipment requiring human interface between machines and humans.

Referring to FIG. 2, the sensors 130.1 and 130.2 connect to a staff sheet printer 100 externally. The purpose of the sensors 130.1 and 130.2 is to measure how a player plays notes. For each musical instrument's input, it has a plurality sensors to measure such items as strings, keys, and pads. The sensors 130.1 and 130.2 are comprised of piezoelectric or photodiodes or mechanical switches. The sensors 130.1 and 130.2 can detect vibration, pressure, speed, and distance of each input element of musical instruments. By measuring these parameters, the staff sheet printer 100 can print correct notes on staff sheets 60 according to the tempo 123.1 and time signature 127.1 of that music piece.

Figure 6:
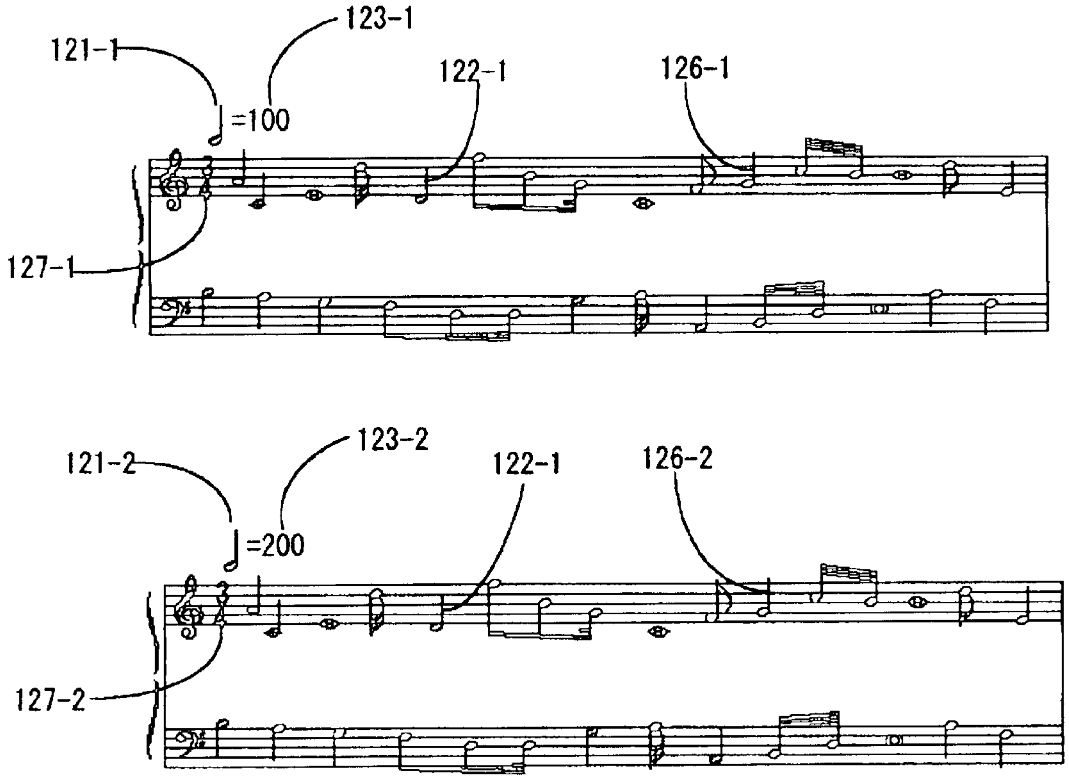
FIG. 6 shows a staff sheet that depicts musical notes along with their associated tempo and time signature.

For example, to find out the difference between a quarter note 126.1 and a half note 122.1 used in music, which has a tempo speed of 100 in FIG. 6, the staff sheet printer 100 needs to know its speed in the given tempo parameter of the music. By measuring characteristics of notes played, the staff sheet printer 100 can figure out whether it is a quarter note or a half note because the length of the quarter note is shorter than the half note. Hence, the staff sheet printer 100 can print correct notes on the staff sheets 60 for a given tempo of the music piece. To figure out the volume sound of each note, the staff sheet printer 100 needs to know how fast each note is played. All of the characteristics are possible to measure by having sensors 130.1 and 130.2 since the sensors 130.1 and 130.2 keep on monitoring the characteristics of musical instruments in real time mode.

Referring to FIG. 2, the multiplexer (MUX) 135 controls the signal processing modules 134.1 and 134.2. Since two musical instruments are connected, the MUX multiplexer 135 instructs each signal processing unit 134.1 and 124.2 according to the parameters characteristic information about music played by a player and a CPU model 120.

Referring to FIG. 2, the interface module for sensors (A/D) 132.1 and 132.2 are used to connect sensors 130.1 and 130.2 and the rest of internal modules of a staff sheet printer 100. By the nature of these sensors 130.1 and 130.2, input voltage or current generated by these sensors 130.1 and 130.2 sensors are very small, and they cannot be interfaced to standard computer circuit directly. Therefore, a staff sheet printer 100 requires the interface modules for sensors 132.1 and 132.2.

Referring to FIG. 2, the memory module 138 RAM is temporarily memory space, which is used to store dynamic data sent by signal processing modules 134.1 and 134.2, while a musical instrument player plays music. It is also used to store printable bit map data for printing staff sheets 60.

Referring to FIG. 2, the read only memory module (ROM) 116 stores several pieces of software. One software stores musical note fonts permanently, while another is operating software. When a staff sheet printer 100 turns on, a CPU module reads the operating software from the memory module ROM 116 first. All instruction used internally by the staff sheet printer 100 is stored in this memory module ROM 116 as the operating software.

Referring to FIG. 2, the CPU module 120 controls all modules in a staff sheet printer 60. Nowadays, most of central processing units (CPUs) have a built-in graphic processor, which has enough capability to generate printable bit map data using stored fonts and signals generated by signal processing module A/D 134.1 and 134.2

Figure 3:
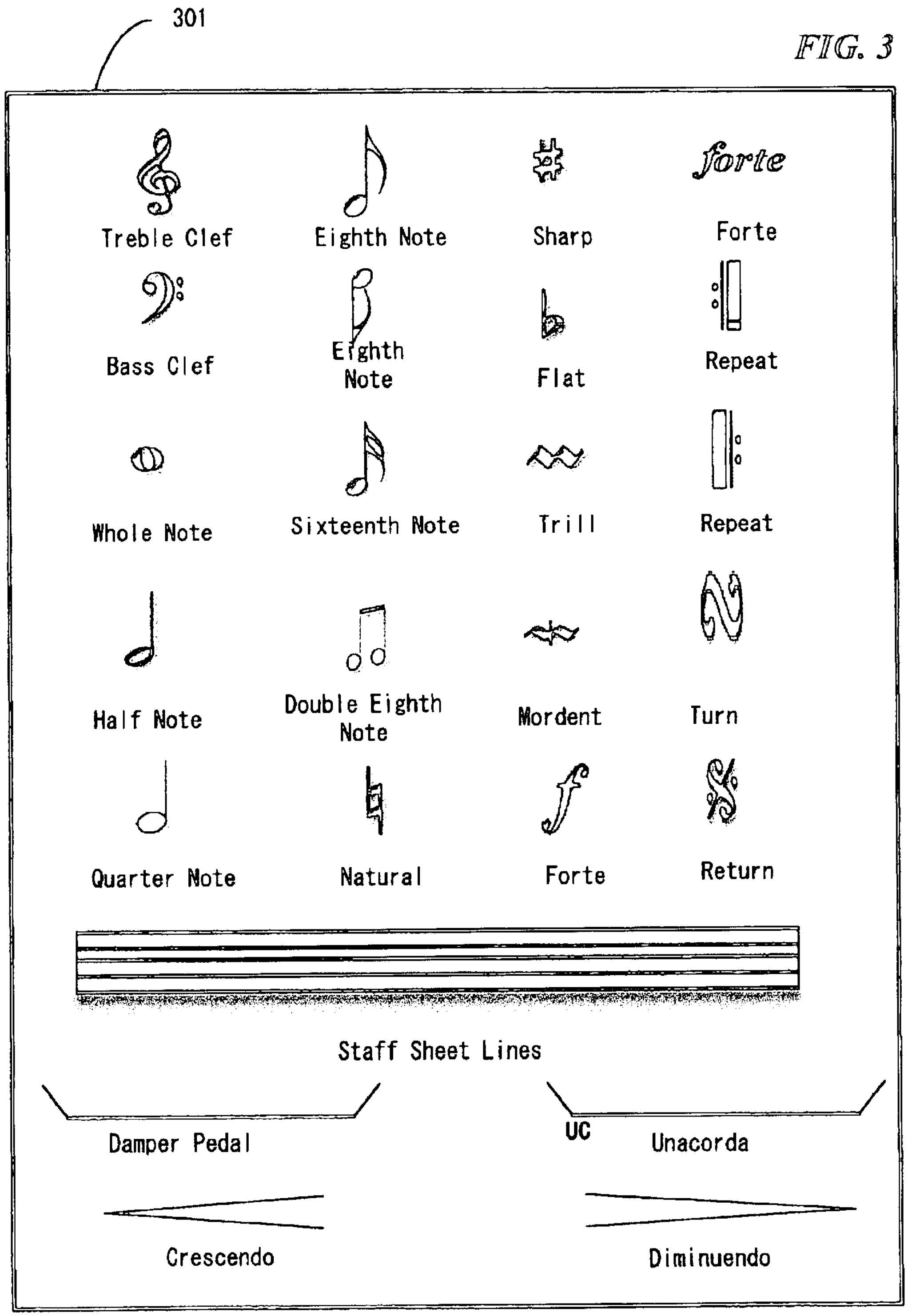
FIG. 3 shows a plurality of musical fonts used to generate a printable bit map for printing staff sheets.
Figure 4:
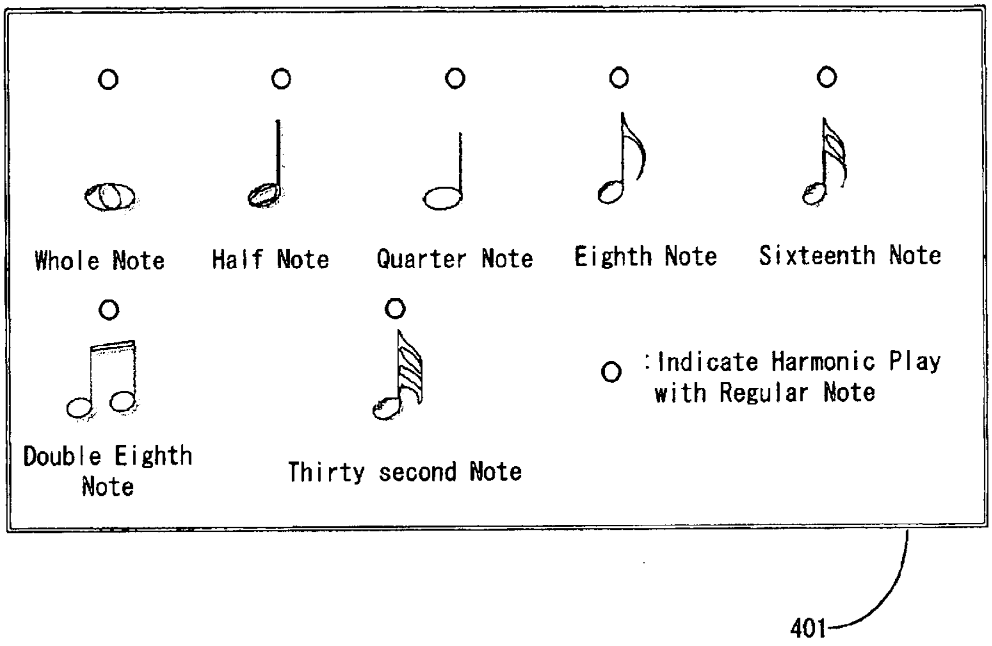
FIG. 4 shows a plurality of the musical fonts used in violin as the exceptional fonts.
Figure 5:
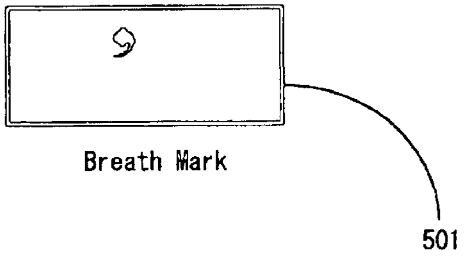
FIG. 5 shows a font used in flute as the exceptional fonts.

Referring to FIGS. 3, 4, and 5 all of music notations such as quarter, half, whole notes, and all music note fonts are stored in the memory module ROM 116 as the bit map font data structure. The font called harmonic notes 401, depicted in FIG. 4, is an exceptional font used by violin instruments but not used by the piano. A font, called Breath Mark 501, depicted in FIG. 5, is an exceptional font used in flute, but certain types of musical instruments do not use it. Since fonts can vary depending on the types of musical instruments played, they must be stored in the memory module ROM 116.

A CPU module 120 references correct fonts; it discovers the correct music notes by referencing the dynamic data, generated by the musical instrument, and the correct fonts are then stored in memory module ROM 116. The CPU module 120 stores the dynamic data in memory module RAM 138 after signal processing modules (A/D) 134.1 and 134.2 converts signals received by interface modules 132.1 and 132.2. After the CPU module 120 fetches corresponding notes, then it stores in the memory module RAM 138, which is later used to built complete printable bit map data for printing staff sheets 60, in real time mode. The CPU module 120 processes all of the signals until the music player presses the stop button (STP) 104. When a print button (P) 108 is pressed, then a staff sheet printer 100 prints staff sheets 60.

Before the staff sheet printer 100 prints the staff sheets 60, the CPU module 120 processes the final data to build printable data, which contains all information including the tempo parameter, the time signature, the staff sheet lines for treble and bass clefs, and all notes played by a musical instrument player. They are rendered and stored in the memory module RAM 138 as the printable bit map data format. In other words, the rendered data in the memory module 138 now is the replica of a staff sheet. The memory module RAM 138 can store many pages of data. This data format has 600 dots per inch resolution at the minimum. The margins, line spacing, and other parameters for printing are pre-programmed since there is no printer drivers used in general printers such as PCL5e or PCL 6 (Printer Control Language designed by Hewlett-Packard Corp.).

Once the printable bit map data for staff sheets is built and stored in the memory module RAM 138 completely, then the CPU module 120 sends them to the printer module 136. Thereby the printer module 136 prints its image line by line. Each page consists of bit patterns, translated and rendered by the CPU module 120, onto plurality of papers 60 accordingly.

Figure 7:
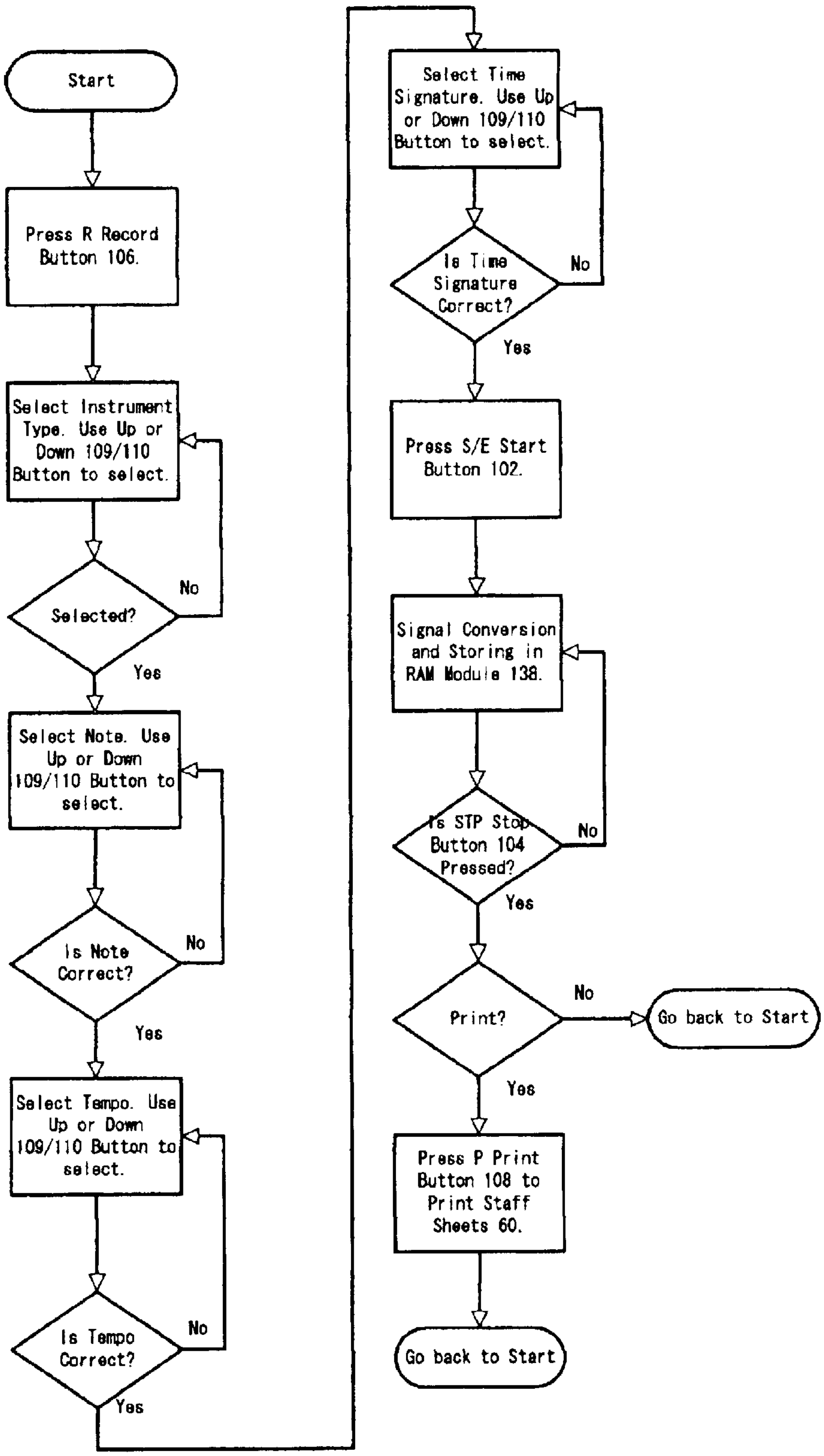
FIG. 7 shows a flow chart depicting how to input the numbered parameters shown in FIG. 6 before the musical notes are played.

Referring to FIG. 7, the flow chart shows the operation of a newly invented staff sheet printer 100. It shows the method to select a musical instrument type, a given note, its tempo, and its time signature.

From the description above, a number of advantages of this newly invented staff sheet printer for practicing acoustic musical instruments such as the acoustic Japanese Koto or xylophone become evident:

(a) No tape recorder is required to record playing music to find out how accurately the musical instrument player is practicing. Since all music notes played by them are printed as the staff sheets, finding errors can be checked visually easily;

(b) practicing how to play musical instruments with this newly invented staff sheet printer is similar to having a music teacher giving instruction to a musical instrument player at any time;

(c) it can improve the performance of musical instrument players;

(d) musical instrument players can save lesson fees and time using this staff sheet printer since repetitive lesson fees are not required; and (e) musical instrument players can make duplicate copies of their own music notes easily.

In reality, the staff sheet printer 100 can connect with any musical instruments by changing the physical characteristics and shapes of the sensors 130.1 and 130.2 (FIG. 2). For example, vibration sensors can be used for acoustic string instruments. These sensors convert string vibration, created by players who hit strings, to analog signal, and then they are converted to digital data by the signal-processing module 134. For acoustic wind instruments such as flute, mechanical sensors can be attached underneath of each pad in each musical instrument. These sensors work ON or OFF modes, which are the same as the binary number system used in computer systems. Hence, it is so easy to translate finger motion to digital signals.

Operation—FIGS. 1, 2, 3, 4, 5, 6, and 7

To record the playing of Japanese Koto 10 and xylophone 20 using the newly invented staff sheet printer 100 (FIG. 1) a musical instrument player needs to select a correct musical instrument for each sensor. In order to do that, the player can select the musical instrument type by pressing up or down button 109 and 110, and left or right cursor control button 112 or 114. The music player also needs to input the time signature 127.1 information parameter for the given note 121.1 and its tempo 123.1. Finally, the recorded button 106 is pressed. For example, the portion of the music piece in FIG. 6 has the quarter note 121.1 with the speed 100 of the tempo 123.1, and the time signature of three quarters 127.1. First, the user selects the quarter note 121.1 by pressing up or down buttons 109 and 110 respectively. Pressing S/E button 102 confirms that the proper note is selected. Next, the user selects the speed 100 of the tempo 123.1 next by moving the cursor to right by pressing the right arrow button 114 and then pressing the up or down arrow buttons 109 and 110 respectively. Then the user needs to select the time signature of 127.1, using the same buttons as before. Finally, the player is simply asked to press a S/E button 102 before he/she begins.

Once the musical instrument player finishes playing the music, or at any time during the playing, the player pushes the STP stop button 104. At this moment, the music played is converted and stored in a memory module 138 as a digital format. When the musical instrument player pushes a P print button 108, the staff sheet printer 100 prints music staff sheets 60 with played music notes, which should be identical to the original music sheets if the player has made no mistakes. However, if there are mistakes, the player can discover visually where he/she hit wrong notes by comparing the printed staff sheets 60 with the original music sheets.

Conclusion, Ramifications, and Scope

Accordingly, the reader will see that the staff sheet printer for practicing musical instruments can be used as a virtual music teacher. Novice musical instrument players can compose music easily by using this staff sheet printer with any musical instruments since all notes they played or printed as music staff sheets. Furthermore, the staff sheet printer has additional advantages in that:

a musical instrument player's skill and artistic performance can be improved using this staff sheet printer;

the musical instrument player can save lesson fees and time using this staff sheet printer since repetitive lesson fees are not required; and printed music staff sheets can be duplicated since they are printed as the hard copy.

Although the description above contains many specifications, these should not be construed as limiting the scope of the invention but as merely providing illustrations of some of the presently preferred embodiments of this invention. For example, the staff sheet printer can connect to other musical instrument types when sensors are modified.

Thus, the scope of the invention should not be determined by the appended claims and their legal equivalent, rather than by the examples given.

I claim:

1. A staff sheet printer comprising:

(a) a plurality of sensors means sensing a plurality of strokes of keys, vibration, pressure, and other means of making sound operated by a plurality of musical instrument players, wherein said sensors consist of electronic photodiode, piezoelectric components, vibration sensors, and switches;

(b) a plurality of interface modules for said sensors means having a signal interface adaptability for different types of said sensors for all types of the musical instruments, wherein said signal interface adaptability means being able to connect a plurality of small analog voltage or current generated by said sensors to a plurality of voltage or current used in digital circuitry;

(c) a printer module means receiving a plurality of printable bit map data from a plurality of memory module RAM by a plurality of CPU module, and printing said printable bit map data onto a plurality of papers using a plurality of array of pins vertically mounted with one row or several rows on a print head or laser beam print head or thermal print head, wherein said printable bit map data means the data created by using a plurality of font data in a plurality of memory module ROM and a plurality of input information generated by said sensors;

(d) a plurality of operation interface module means having a S/E start/enter button, a STP stop button, a R record button, a P print button, a up or down button, and a cursor left or right button, for said staff sheet printer for setting up a note, a tempo value, and a time signature of the music pieces, which enables said recording function for the music notes that are to be recognized correctly, and printing said printable bit map data for that played music;

(e) a plurality of signal processing module A/D means converting said small analog voltage or current signals received from said sensors to a plurality of digital signals;

(f) a plurality of MUX multiplexer means controlling said multiple signal processing modules for said sensors;

(g) a plurality of memory module RAM means a plurality of temporarily working and storage memory module used by said signal processing modules, said CPU module, said memory module ROM, said printer module, said operation button interface module, and a display module;

(h) a plurality of memory module ROM means storing a plurality of fonts consisting of all musical notes by all musical instrument types and a plurality of an operating software for said staff sheet printer, wherein said operating software means used by said CPU module to control said signal processing module, said MUX multiplexer module, said memory module RAM, said memory module ROM, said printer module, said display module, and said operation button interface module;

(i) a plurality of display module means indicating operational interface between the music players and said staff sheet printer, and displaying the tempo and its associated the music note with the given time signature selected by using said up or down button, and said cursor left or right button or displaying a plurality of messages generated by said printer module for a plurality of warning messages, wherein said warning messages are a plurality of messages generated by said CPU and said printer module;

(j) a plurality of said CPU module means controlling said signal processing modules, said MUX multiplexer, said memory module RAM, said memory module ROM, said printer module, said display module, and said operation button module interface module;

(k) a plurality of software stored in said memory module ROM provides a plurality of instructions to said CPU module to monitor difference types of said sensors and any music notes played;

(l) a plurality of said software stored in said memory module ROM provides a plurality of instructions to the said CPU module to convert a plurality of small signal generated by said sensors to a plurality of digital signals, and said converted digital signal is cross referenced against said fonts stored in said module ROM, wherein said digital signals is stored in said RAM;

(m) a plurality of said software stored in said memory module ROM provides a plurality of instructions to said CPU module to build printable bit map data in said memory module RAM for printing a plurality of staff sheets using said fonts and said stored digital signals;

(n) a plurality of said software stored in said memory module ROM provides a plurality of instructions to said CPU module to gather a plurality of the given music note, the tempo, and the time signature of the music parameters for an operation of said staff sheet printer, and said information is stored in said memory module RAM, wherein said operation means to use said buttons connected to said operation button interface module, Furthermore, the music parameters are selected for playing the music using said cursor control buttons on said display module; and (o) a plurality of said software stored in said memory module ROM provides a plurality of instructions to said CPU module to control MUX multiplexer to monitor said signal processing modules for different musical instruments;

(p) a plurality of said software stored in said memory module ROM provides a plurality of instructions to said CPU module to print a plurality of bit map data to said printer module.

2. A staff sheet printer according to claim 1, wherein said fonts having different music notes for a plurality of different musical instrument types are stored in said memory module ROM, wherein said fonts consist of a plurality of pitches, a plurality of ties, and a plurality of dotted-notes for a whole note, a half note, a quarter note, an eight note, a sixteenth note, and a thirty-second note, Furthermore, a treble clef, a bass clef, a sharp, a flat, a natural, a trill, a forte, a repeat, a turn, a return, a staff sheet lines, a damper a pedal, an unacorda, a crescendo, a diminuendo, a plurality of harmonic notes for violin, and a breath mark for flute are stored in said ROM.

3. A staff sheet printer according to claim 1, said printer module means having a plurality of print heads, which are consist of array of pins vertically mounted with several rows, or thermal print head or laser beam print head, wherein said print heads print said printable bit map data rendered by said CPU module using a plurality of fonts and a plurality of converted digital signals.

* * * * *